United States Patent [19]
Redmore et al.

[11] 3,779,912
[45] Dec. 18, 1973

[54] WATER CLARIFICATION PROCESS USING SILICON-CONTAINING AMINOMETHYL PHOSPHONATES

[75] Inventors: Derek Redmore, Ballwin; Frederick T. Welge, Webster Groves, both of Mo.

[73] Assignee: Petrolite Corporation, Wilmington, Del.

[22] Filed: Oct. 2, 1972

[21] Appl. No.: 294,491

Related U.S. Application Data

[62] Division of Ser. No. 80,124, Oct. 12, 1970, Pat. No. 3,716,569.

[52] U.S. Cl. .................................. 210/54, 210/58
[51] Int. Cl. ............................................. C02b 1/20
[58] Field of Search .................. 210/52, 54, 58, 59

[56] References Cited
UNITED STATES PATENTS
3,700,715   10/1972   Berger ................................ 210/54

*Primary Examiner*—Samih N. Zaharna
*Assistant Examiner*—Benoit Castel
*Attorney*—Sidney B. Ring

[57] ABSTRACT

Silicon-containing aminomethyl, or substituted aminomethyl, phosphonic acids and derivatives thereof. The silicon atom is silicone functional (i.e., has a -SiO- group) and is also attached to an alkyleneamino group which may have one or more amino groups (i.e., an alkylene-amin group having at least one N-H group) capable of reacting with a carbonyl compound (i.e., aldehyde or ketone) and phosphorous acid, or a derivative thereof, to form aminomethyl phosphonic acid. All, or less than all, of the N-H groups may be converted to aminomethyl phosphonic acids. The silicon-aminomethyl phosphonic acids may be monomeric, polymeric, or copolymeric. They are useful, for example, as corrosion inhibitors, scale inhibitors, water clarifiers and for other uses.

5 Claims, No Drawings

WATER CLARIFICATION PROCESS USING SILICON-CONTAINING AMINOMETHYL PHOSPHONATES

This application is a division of our copending Application Ser. No. 80,124 filed on Oct. 12, 1970 now U.S. patent 3716569.

This invention relates to silicon-containing aminomethyl, or substituted aminomethyl phosphonic acids and derivatives thereof. More particularly this invention relates to such compounds containing -SiO- groups and polymers and copolymers thereof. These compounds may be described as being N-methyl phosphonic acid derivatives of the following compositions $$(RO)_3Si-A-N-Z \quad \overset{H}{|}$$

and polymers and copolymers thereof; where R is for example a hydrocarbon group such as alkyl, aryl, etc., but preferably lower alkyl, i.e., methyl, ethyl, etc., and Z is for example hydrogen, hydrocarbon such as alkyl, aryl, etc.

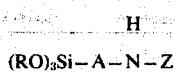

where R' is for example hydrogen, a hydrocarbon group such as alkyl, aryl, etc., where $n$ is a number for example 1 – 25 or more, such as 1 – 10, but preferably 1 – 5. A is an alkylene group $(-CH_2-)_m$ where $m$ is for example 1 – 10, such as 2 – 5, but preferably 2 – 3; carboxy containing; hydroxy-containing; ether containing, etc.

The following are examples of silicon compounds convertible to aminomethyl phosphonic acids.

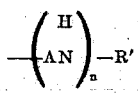

where R is lower alkyl and A is alkylene;

$$(RO)_3SiANH_2$$

where R is lower alkyl and A is alkylene;

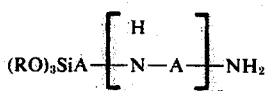

where R is lower alkyl, R' and R'' are hydrogen or alkyl, provided at least 1 R is hydrogen;

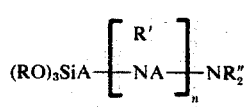

where R is lower alkyl and R' is hydrogen, alkyl, phenyl, etc. and A is alkylene;

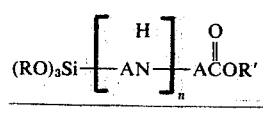

where R is lower alkyl, A is alkylene, R' is H, alkyl, phenyl, etc;

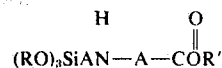

where R is lower alkyl, A is alkylene and R' is hydrogen, alkyl, phenyl, etc.

In the above formulae n is a number for example 1 – 25 or more, such as 1 – 10, but preferably 1 – 10.

Specific examples from which aminomethyl phosphonic acids can be derived include the following:

$$(RO)_3SiCH_2CH_2CH_2\overset{H}{N}-R$$

where the R's, which are the same or different, are alkyl;

$$(RO)_3SiCH_2CH_2CH_2(\overset{H}{N}CH_2CH_2)_nNH_2 \quad n = 1 \text{ or } 25 \text{ or more};$$

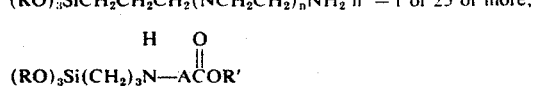

where R is alkyl, A is alkylene, and R' is hydrogen, alkyl, aryl, etc.

Also included are polymers and copolymers thereof, such as silicone polymers having

units for example a copolymer of a compound having the formula

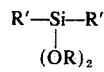

where R' is alkyl, aryl, etc. and R is alkyl, etc. and a compound of the formula $$(RO)_3SiAN-Z \quad \overset{H}{|}$$

to yield a copolymer ideally presented as

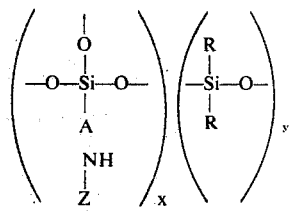

where $x$ and $y$ are the number of individual units of each moiety.

These compounds can be converted to the aminomethyl or a substituted aminomethyl phosphonic acid in whole or in part either before or after polymerization. In such conversion one, all or less than all, of the available N-H groups in the monomer or polymer is converted to a

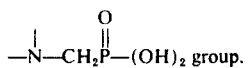

These compounds have a wide variety of uses such as corrosion inhibitors, scale inhibitors, water clarifiers, etc.

The aminomethyl or substituted aminomethyl phosphonic acids of this invention may be prepared by reacting a siliconamino compound having at least one reactive N-H group with a carbonyl, such as an aldehyde or a ketone, and a phosphorous acid or a derivative thereof, for example, according to the following equation:

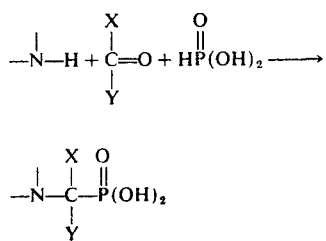

where

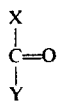

is an aldehyde or a ketone; the X and Y are hydrogen, alkyl, aryl, etc.

The aminomethyl group can be formed from all or less than all of the active N-H groups in the molecule.

Where a derivative of the phosphonic acid is employed such as esters thereof the product is the ester:

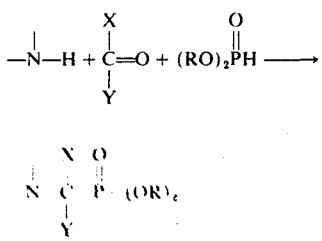

where R is alkyl, aryl, etc.

The ester may be employed as such or converted to the free acid or salts thereof.

Salts may be formed, for example, salts containing metal, ammonium, amino, etc. groups such as sodium, potassium, triethanolamine, diethanolamine, etc.

The term "phosphonate" as employed herein refers to phosphonic acids, and derivatives thereof, such as the free acid, salts, esters, etc; and polymers and copolymers, etc. thereof.

The following examples are presented for purpose of illustration and not of limitation.

Example 1

(Trimethoxysilylpropyl) ethylene diamine (55.6g; 0.25 mole) was placed in a flask fitted with mechanical stirrer, condenser and thermometer. To this amine was added phosphorous acid (42g; 0.5 mole) dissolved in water (50 ml) and hydrochloric acid (50 ml). The mixture was heated to gentle reflux (105°–110°) and 40 percent formaldehyde (38 ml. 0.5 mole) was added dropwise during 1 hour. After the addition the mixture was heated under reflux for 1 hour to complete the reaction.

The product is represented by the following formulae:

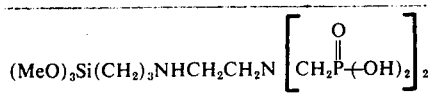

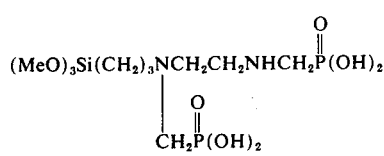

Example 2

Following the procedure of Example 1 (trimethoxysilylpropyl) ethylene diamine (55.6g; 0.25 mole) was reacted with 40 percent formaldehyde (19 ml; 0.25 mole) and phosphorous acid (21g; 0.25 mole). The product is represented by the following formula:

Example 3

(Trimethoxysilylpropyl) methyl amine (48.3g; 0.25 mole) was heated to reflux with phosphorous acid (21g; 0.25 mole) in water (50 ml) and hydrochloric acid (50 ml) and 40 percent formaldehyde (19 ml; 0.25 mole) was added dropwise during 1 hour. After heating for an additional 1 hour the reaction mixture was cooled. The product is represented by the formula:

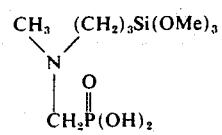

Example 4

Phosphonic acid from ethylene diamine derivative $(MeO)_3Si(CH_2)_3NHCH_2CH_2NHCH_2CH_2CO_2Me$. A 30 percent solution of the above ethylene diamine (103g; 0.1 mole) with phosphorous acid (8.2g; 0.1 mole), water (20ml) and hydrochloric acid (20 ml) was heated under reflux during addition of 40 percent formaldehyde (7.5 ml; 0.1 mole). Reaction was completed by heating one hour. The product is represented as a mixture of the two compounds:

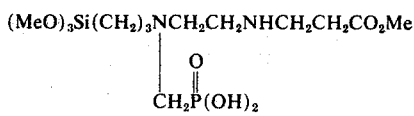

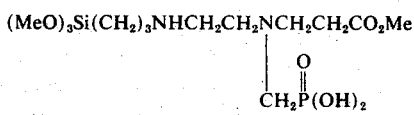

Example 5

The amine used in this Example is a polyaminosilane represented by the following formula:

$$(MeO)_3Si(CH_2)_3(NHCH_2CH_2)_{14}NH_2 \cdot HCl.$$

A mixture of the above polyaminosilane (20.4g; 0.025 eg), phosphorous acid (16.4g; 0.2 mole), hydrochloric acid (50 ml) and water (50 ml) was heated under reflux and 40 percent formaldehyde (15 ml; 0.2 mole) was added dropwise in 1 hour. After heating at reflux for an additional 1-½ hour the reaction was complete.

Example 6

This Example illustrates the use of a silicone polymer derived from a dialkyl dialkyoxysilane and (trimethoxysilylpropyl) methylamine as amine reactant. The copolymer formed by heating diethoxydimethylsilane and (trimethoxysilylpropyl) methylamine (mole ratio 10:1) with base (83.6g; 0.05 —NH equivalents) was heated under reflux with phosphorous acid (4.1g; 0.05 mole) in 10 ml of water and hydrochloric acid (10 ml) during the addition of 40 percent formaldehyde (3.8 ml; 0.05 mole). Following the addition the reaction was completed by heating 1 hour under reflux.

The product is a silicone partially cross-linked polymer bearing methyl phosphonic acid group.

Example 7

This Example illustrates the formation of silicon-containing phosphoric acid which is copolymerized with an alkoxy silane.

The product of Example 1 free of water (70.2; 0.1 mole) was neutralized to pH7 with sodium hydroxide and diethoxy dimethyl silane (14.8g; 0.1 mole) and additional sodium hydroxide (0.1g) added. The mixture was heated at 110°–115° for 2 hours and the distillate collected. The polymeric product was dissolved in water.

Example 8

This compound is an non-silicon containing aminomethylphosphonic acid prepared for comparison purposes.

A mixture of N-methylethylene diamine (7.4g; 0.1 mole) phosphorous acid (8.2g; 0.1 mole), hydrochloric acid (20 ml) and water (20 ml) was heated under reflux while 40 percent formaldehyde (7.5 ml; 0.1 mole) was added dropwise in 50 min. The reaction mixture was heated under reflux for 1 additional hour.

The product is represented by the formula:

The silicon-containing phosphonates of this invention are particularly useful as corrosion inhibitors in aqueous and/or oxygen-containing or aerated systems such as occurs in brines, drilling fluids, air drilling, water flooding, disposal wells, etc.

USE IN BRINES

This phase of the invention relates to the prevention of corrosion in systems containing a corrosive aqueous medium, and most particularly in systems containing brines.

More particularly, this invention relates to the prevention of corrosion in the secondary recovery of petroleum by water flooding and in the disposal of waste water and brine from oil and gas wells. Still more particularly, this invention relates to a process of preventing corrosion in water flooding and in the disposal of waste water and brine from oil and gas wells which is characterized by injecting into an underground formation an aqueous solution containing minor amounts of compositions of this invention, in sufficient amounts to prevent the corrosion of metals employed in such operation. This invention also relates to corrosion inhibited brine solutions of these compounds.

When an oil well ceases to flow by the natural pressure in the formation and/or substantial quantities of oil can no longer be obtained by the usual pumping methods, various processes are sometimes used for the treatment of the oil-bearing formation in order to increase the flow of the oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

We have now discovered a method of preventing corrosion in systems containing a corrosive aqueous media, and most particularly in systems containing brines, which is characterized by employing the compositions of this invention.

We have also discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation the compositions of this invention.

This phase of the invention then is particularly concerned with preventing corrosion in a water flooding process characterized by the flooding medium containing an aqueous or an oil field brine solution of these compounds.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compositions of this invention can also be used in such water disposal wells thus providing a simple and economical method of solving the corrosion problems encountered in disposing of unwanted water.

Water flood and waste disposal operations are too well known to require further elaboration. In essence, in the present process, the flooding operation is effected in the conventional manner except that the flooding medium contains a minor amount of the reducing compound, sufficient to prevent corrosion, in concentrations of about 10 p.p.m. to 10,000 p.p.m., or more, for example, about 50 to 5,000 p.p.m., but preferably about 15 to 1,500 p.p.m. The upper limiting amount of the compounds is determined by economic considerations. Since the success of a water flooding operation manifestly depends upon its total cost being less than the value of the additional oil recovered from the oil reservoir, it is quite important to use as little as possible of these compounds consistent with optimum corrosion inhibition. Optimum performance is generally obtained employing about 100 p.p.m. Since these compounds are themselves inexpensive and are used in low concentrations, they enhance the success of a flood operation by lowering the cost thereof.

In addition, these compounds are not sensitive to oxygen content of the water and these are effective corrosion inhibitors in both open water flooding systems and closed water flooding systems.

While the flooding medium employed in accordance with the present invention contains water or oil field brine and the compounds, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc., and in conjunction with other secondary recovery methods.

USE IN FLUIDS FOR DRILLING WELLS

This phase of the invention relates to the use of the compounds of this invention as corrosion inhibitors in producing an improved drilling fluid useful in drilling oil and gas wells.

Fluids commonly used for the drilling of oil and gas wells are of two general types: water-base drilling fluids comprising, for example, a clay suspended in water, and oil-base drilling fluids comprising, for example, a clay or calcium carbonate suspended in mineral oil.

A third type of drilling fluid which has recently been developed, is one of oil-in-water or water-in-oil emulsion, for example, emulsions of mineral oil in water or water in mineral oil formed by means of emulsifiers such as sulfuric acid; Turkey-red oil; soaps of fatty acids, for example, sodium oleate; emulsoid colloids, for example starch, sodium alginate, etc. Varying amounts of finely divided clay, silica, calcium carbonate, blown asphalt, and other materials may be added to these emulsions to improve their properties and control their weight.

We have now discovered that the compositions of this invention can be employed as a corrosion inhibitor in drilling fluids.

USE IN AIR DRILLING

It has long been conventional practice in drilling deep bore holes to circulate a drilling mud down through the drill stem and up through the bore hole between the wall of the bore hole and the drill stem for the removal of chips or cuttings from the bore hole and to provide support for the wall of the bore hole. More recently, in the drilling of holes in which wall support provided by drilling mud is not employed, drilling has been carried out with the use of air for chip removal. Such drilling is not only normally faster than mud drilling but is indispensable in areas where the supply of water is limited or when drilling through cavernous formations into which the drilling mud flows and becomes lost.

The increasing popularity or air or gas drilling has come about not only because this method of drilling is frequently faster, as noted above, but for the additional reasons that the drill bits last longer, the provision and handling of water under wide ranges of temperature conditions is avoided, boring samples are easily observed when they are not mixed with mud, and there is no loss involved as in the case of mud drilling when drilling through cavernous formations. Furthermore, prompt removal of water entering the hole maintains a dry hole and the likelihood of wall collapse is thereby reduced.

In a typical air drilling operation there may be provided, for example, an up-flow of air in the bore hole having a velocity of the order of 3,000 feet per minute. This flow of air upwardly through the bore hole, which is produced by air pumped downwardly through the drill stem, provides adequate removal of cuttings. The air is delivered to the drill stem at pressures of 20 to 60 lbs. per square inch and for dewatering or for breaking obstructions, as will be hereinafter described, the pressures may be increased to 180 to 200 lbs. or more per square inch.

Air drilling operations are frequently hampered by the inflow of water into the bore hole when the drill bit is penetrating a water bearing stratum or when the bore hole has passed through a water bearing stratum that has not been cased. Normally, if drilling proceeds uninterruptedly both before and during penetration into a water bearing stratum, the flow of air is sufficient to blow the water out of the bore hole along with the cuttings and drilling dirt. There are, however, two major problems encountered in air drilling when water is entering the bore hole. The first problem occurs when there is a small inflow of water sufficient to cause a dampening of the cuttings which, under certain conditions, will then ball-up, clogging and sometimes jamming the drill bit. The second problem is encountered when there is a substantial amount of water remaining in the bottom of the bore hole during drilling causing a sloughing of the side wall of the bore hole. This latter condition may arise even though the water entering the bore hole is being blown out of the hole as fast as it enters. If there is a substantial inflow of water or if there is a substantial flow of water past a region of the bore hole susceptible to this condition, the water passing that region of the bore hole may cause a sloughing of the side wall.

The addition of foam forming materials to the air flow when air drilling is employed in conjunction with sufficient water to provide foaming gives rise to numerous advantages in drilling operations. The water may be introduced either through a water bearing stratum being penetrated by the drill bit or, alternatively, if the hole is dry, water may be introduced from the surface of the earth through the drill stem in conjunction with the delivery of compressed air and foam forming material through the drill stem to the drill bit. In either case the water may be said to be existing in the bore hole, and drilling operations are described in U.S. Pat. No. 3,130,798.

The compositions of this invention can be employed as a corrosion inhibitor in a drilling system.

The compositions of this invention may also be added to other aqueous and/or oxygenated systems such as steam generating systems, water circulating systems such as in cooling towers, in automobile radiators, in diesel locomotive engines, in boiler water, etc.

The amount of the compositions of the invention to be employed as a corrosion inhibitor can vary widely depending upon particular compounds, the particular system, the amounts of oxygen present, etc. We may employ concentrations of from about 0.5 to 5,000 p.p.m., such as from about 4 to 4,000 p.p.m., for example from about 20 to 2,000 p.p.m., but preferably from about 100 to 1,000 p.p.m. The optimum amount, to be determined in each instance, which will depend on function and economics, can be lesser or greater than the above amounts under proper conditions.

Corrosion tests were made using sand blasted 1020 mild steel coupons monitored by a polarization resistance meter, a PAIR instrument described in U.S. Pat. No. 3,406,101. These tests were made in cylindrical containers of 1,500 cc volume with provision for constant stirring by means of a motor driven impeller. A thermostatically controlled immersion heater maintained an average temperature of 80° C. and an air inlet kept the fluids constantly saturated with air. Between each test the cylinder was cleaned with steam, benzene, acetone and thoroughly washed with clean water. Results of these corrosion tests made in various aqueous environments is shown in the following Table.

Protection is calculated in the usual manner from corrosion rate ($R_1$) of fluids without inhibitor and corrosion rate ($R_2$) in presence of particular inhibitor according to the formula $$R_1 - R_2/R_1 \times 100 = \text{Percent protection.}$$

TABLE A.—CORROSION RESULTS IN LABORATORY BRINE
(4.2% NaCl, 1.7% $MgCl_2$, 0.15 $CaCl_2$, 0.09% $Na_2SO_4$ pH 6.0)

Air Saturated Brine at 80° C.

| Compound | Concentration (ppm) | Corrosion rate (mpy) | Percent protection |
|---|---|---|---|
| Example 2 (as sodium salt).... | 1000 | 2.6 | 97 |
| Do.............................. | 125 | 5.8 | 92 |
| Example 8 (as sodium salt).... | 1000 | 4.0 | 95 |
| Do.............................. | 125 | 40.0 | 46 |
| Example 6 (sodium salt)........ | 1000 | 3.0 | 96 |
| Example 7 (sodium salt)........ | 1000 | 2.4 | 97 |
| Blank................................... |  | 74.0 |  |

A comparison Example 2 with Example 8 shows the superior performance of silicon-containing over non-silicon-containing phosphonic acids.

USE AS SCALE INHIBITORS

This phase of the invention relates to methods of inhibiting scale formation and/or the formation of solid scale-forming salts in water or brine comprising adding to said water or brine small amounts of silicon-amino methyl phosphonates of this invention.

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. This scale is an expensive problem in many industrial water systems, causing delays and shutdowns for cleaning and removal.

We have now discovered that the use of the siliconaminomethyl phosphonates of this invention inhibits the formation of scale.

The silicon-aminomethyl phosphonates of this invention were also found to exhibit good deflocculating or dispersing properties and good surfactancy properties. It is highly unusual for both of these properties to be effectively exhibited by the same compound. As can be appreciated, such compounds can advantageously be utilized in applications which can use the foregoing properties, such as, detergent compositions. In many detergent applications such as textile washing and hard surface cleaning, the ability of the detergent composition to remove the soil and keep the soil suspended in the washing medium is of paramount importance.

As used in detergent compositions, the compounds of the instant invention are preferably formulated with other components, i.e., builders such as sodium tripolyphosphate, anti-redeposition agents such as carboxymethyl cellulose, brightening agents and the like, in amounts between about 10 to 50 percent by weight of the detergent composition.

The following examples are presented to illustrate the use of the phosphonates prescribed herein and are presented for purposes of illustration and not of limitation.

The following test was used to evaluate these compositions as scale inhibitors.

Procedure:
1. Make up stock $CaCl_2 \cdot 2H_2O$. 2.94 g/L or 56 g/5 gallons (18.9 liters)
2. Stock $NaHCO_3$ should be 3.35 g/L or 64 g/5 gallons.
3. Inhibitors — Make 0.1 percent solutions in deionized water. 1 ml in 100 sample = 10 ppm (Test at 5, 20, and 50 ppm.)

Put 50 ml bicarbonate solution into 100 ml milk dilution bottle. Add inhibitor (for 100 ml final Volume). Then add 50 ml $CaCl_2$ solution and set in bath at 180° F. Do not cap. Always prepare a blank. Run a hardness determination on a 50—50 mixture before heating.

Heat at 180° F. Take 10 ml samples from bottles after 2 hours and 4 hours.

Filter through millipore filter.
Run total hardness on filtrate.
Calculate as percent Ca still in solution, i.e., Total hardness after heating/Total hardness before heating × 100 = percent All of the compounds were tested at 180° F. at 5, 20, and 50 ppm levels. Hardness readings were taken after 2 and 4 hours.

TABLE B

Scale Inhibitor Tests

| Compound | Concentration | % Protection |
|---|---|---|
| Example 1 | 5 ppm | 23% |
|  | 50 ppm | 42% |
| Example 1 (sodium salt) | 50 ppm | 39% |
| Example 2 | 5 ppm | 29% |
|  | 50 ppm | 36% |
| Example 3 | 5 ppm | 29% |
| Example 5 (sodium salt) | 5 ppm | 31% |
|  | 50 ppm | 30% |
| Typical Commercial | 5 ppm | 24% |
| Inhibitor | 50 ppm | 30% |

WATER CLARIFICATION

This phase of the present invention relates to a method for the clarification of water containing suspended matter.

Accordingly clarification of water containing suspended particles of matter is effected by adding to such water compounds of this invention.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although sub-surface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles. This is likewise true of particles of suspended material in industrial or sanitary waters. The ultimate particles of silt or other materials are therefore naturally somewhat aggregated by reason of the presence of such electrolytes. However, the forces binding such ultimate particles together are not great and moreover are not such as to generally effect either rapid settling rates of the flocculated material or strong enough to prevent deflocculation.

The compounds of this invention cause rapid flocculation and also reinforce the formed aggregates of particles causing a general tightening or bonding together of the initial particles and an increased rate of coagulation and settling, thus forming a less turbid supernatant liquid.

The addition of the compounds of this invention to the water suspension should be made in such a fashion that the resulting flocculation and aggregation of the particles takes place uniformly throughout the body of water. In order to obtain a uniform addition of the compositions of the invention to the water-borne suspension it is generally desirable to prepare a relatively dilute stock solution of the compositions and then to add such solution to the body of water in the proportions indicated. Clarification may take place either in the natural body of water or it may be caused to take place in hydraulic thickeners of known design.

The amount of the compositions to be employed will vary depending upon the amount and the degree of subdivision of the solids to be agglomerated or flocculated, the chemical nature of such solid and the particular inventive compositions employed. In general, we employ at least a sufficient amount of the compositions to promote flocculation. In general, we employ 0.005 – 10,000 ppm or more such as about 0.5 – 1,000 ppm, for example about 1 – 500 ppm, but preferably about 2 – 5 ppm. Since the economics of these processes are important, no more than the minimum amount required for efficient removal is generally employed. It is desired, of course, to employ sufficient compositions so flocculation will take place without causing the formation of stable dispersions.

The precipitating action of the compositions can be employed in the application of loading or filling materials to textiles or paper.

In the processing of fine mineral particles in aqueous suspension the flocculating agents will be especially useful. In the processing of ores to separate valuable mineral constituents from undesirable matrix constituents, it is frequent practice to grind the ore into a finely-divided state to facilitate separation steps such as selective flotaion and the like. In many ore dressing procedures, the finely-divided ore is suspended in water to form a pulp or slime. After processing, it is usually desirable to dewater the pulps or slimes either by sedimentation or filtering. In such operations, certain ores are particularly troublesome in that the finely-divided ore, when suspended in water, forms a stable slime which settles very slowly, if at all. Such slimes are unsuitable for concentration or dewatering by sedimentation and are difficult to dewater by filtration because of the tendency to clog the pores of the filter, thus leading the excessively time-consuming and inefficient operation of the filters. In some cases, for example, in certain phosphate mining operations, the formation of very stable suspensions of finely-divided mineral results not only in the loss of considerable valuable mineral as waste but also requires large expenditures for the maintenance of holding ponds for the waste. Similar problems are involved in processing gold, copper, nickel, lead, zinc, iron, such as taconite ores, uranium and other ores, and the inventive flocculating agents will be useful in these operations.

Some specific additional applications for the compositions of this invention, not intended to be limiting but merely illustrative are listed below. The compositions can be used for the clarification of beers or wines during manufacture. Another use is in processing effluents in pharmaceutical operations for the recovery of valuable products or removal of undesirable by-products. A particularly important use for these flocculating agents is in the clarification of both beet sugar and cane sugar juices in their processing. Still another use is for flocculation and recovery of pigments from aqueous suspensions thereof. The compositions will be particularly useful in sewage treatment operations as a flocculating agent. A further use is to promote by flocculation the removal of coal from aqueous suspensions thereof. In other words, the flocculating agents of the invention are generally useful for processing aqueous effluents of all types to facilitate the removal of suspended solids.

A water soluble or water dispersible compound, to the extent of effective concentration, is employed.

These compositions can also be employed in the process of flocculating white water and/or recycling of the precipitate solids in the paper making process.

Although the manner of practicing the present invention is clear from the foregoing description, the following non-limiting specific examples are included for purposes of illustration.

Naturally occurring water from many sources, and in some instances, brine and brackish waters are used in the recovery of petroleum by secondary water-flooding operations. Clarification of the water is necessary in many instances prior to water flooding because the suspended impurities tend to plug the underground formations into which waters are pumped.

Examples

A suspension of FeS in brine was subjected to the action of the water-soluble compounds prepared herein.

In these tests, the FeS concentration is 25 parts per million and 1 and 5 percent brine solution were used. Metered quantities (500 ml.) of the homogeneous suspension were placed into 1,000 ml. beakers and stirred at 100 rpm. The compound to be tested was injected into the suspension to give final active concentrations varying between 2 through 4 parts per million. Stirring was achieved by use of a Phipp and Bird "floc" multi-stirrer. After one minute the stirring rate was reduced to 20 to 30 rpm and maintained thus for ten minutes. At this time the stirring was stopped. The evaluation of the compound started at the moment of flocculation and continued with respect to the "floc" size and rate of precipitation. The final evaluation was achieved by visual examination of the color of the resultant aqueous phase.

The compositions described herein such as those prepared in the specific Examples are employed as flocculating agent.

These compounds are also effective in flocculating the other systems described herein.

The following is a partial list of industrial systems in which the compounds of the present invention can be employed as flocculating agents.

1. Petroleum industry
2. Food industry such as in the dairy industry, the canning, freezing and dehydration industries
3. Metal plating industry
4. Chemical and pharmaceutical industries
5. Mining industry, for example, in the phosphate mining industry such as in phosphate slimes
6. Fermentation industries, such as in alcohol, beer, yeast, antibiotics, etc. production
7. Tanning industry
8. Meat packing and slaughter house industry
9. Textile industry
10. Sugar refining industry
11. Coal industry
12. Soap industry
13. Sewage purification
14. Corn starch industry
15. Fat processing and soap industry
16. Paper industry
17. Hydroelectric plants, atomic energy operations, boiler plants, etc.

Examples

The compositions described herein, such as those prepared in the specific Examples, are effective flocculants.

OTHER USES

In addition to the uses described above, these compositions and/or derivatives thereof, can be used as follows:

1. as demulsifiers for water-in-oil and oil-in-water emulsions
2. as biocides i.e., bacteriocides, algicides, etc.
3. as additives to various petroleum fuels including gasoline, diesel fuel, jet fuels, etc.
4. as gasoline anti-icers and anti-stallers
5. as flotation agents, such as flotation collection agents
6. as emulsifiers, for example, in metal cleaners, auto polishes, wax emulsions, etc.
7. as additives for sludging oil and cutting oils
8. as fuel "dehazing" agents
9. as agents for preparing emulsions for the "hydrofrac" process of enhancing oil recovery
10. as agents to prepare polymer emulsions
11. as agents for the textile industry such as mercerizing assistants, wetting agents, rewetting agents, penetrating agents, dispersing agents, softening agents, dyeing assistants, etc.
12. as anti-static agents for textiles, plastics, etc.
13. as agents in leather processing
14. as lube oil additives
15. as emulsifiers for insecticidal and agricultural compositions
16. as additives for primer paints to help insure adhesion to metallic surfaces and give corrosion protection
17. as additives useful as a freeze-thaw stabilizer for latex-base paints
18. as agents for the pulp and paper industry, such as sizing aids, etc.
19. as general metal deactivators In summary, the present invention relates to certain silicon-containing phosphonates and their use as corrosion inhibitors in a wide variety of aqueous and/or oxygenated systems, as scale preventatives and for other uses.

As is quite evident, new silicon-containing phosphonates will be constantly developed which could be useful in our invention. It is, therefore, not only impossible to attempt a comprehensive catalogue of such compositions, but to attempt to describe the invention in its broader aspects in terms of specific chemical names used would be too voluminous and unnecessary since one skilled in the art could by following the description of the invention herein select a useful silicon-containing phosphonate. This invention also lies in the use of suitable silicon-containing phosphonates as corrosion inhibitors in aqueous and/or oxygenated systems and for other uses and their individual compositions are important only in the sense that their properties can affect this function. To precisely define each specific useful silicon-containing phosphonate in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific silicon-containing phosphonates suitable for this invention by applying them in the process set forth herein. In analogy to the case of a machine, wherein the use of certain materials of construction or dimensions of part would lead to no practical useful result, various materials will be rejected as inapplicable where others would be operative. We can obviously assume that no one will wish to employ a useless silicon-containing phosphonate nor will be misled because it is possible to misapply the teachings of the present disclosure to do so. Thus, any silicon-containing phosphonate that can perform the functions stated herein can be employed.

Having thus described our invention what we claim as new and desire to obtain by Letters Patent is

1. A process of clarifying water containing suspended solids which comprises flocculating said suspended solids by adding to the water a sufficient amount of a silicon-containing aminomethyl, or substituted aminomethyl, phosphonate or polymer or copolymer thereof wherein nitrogen is interconnected to phosphorus through a

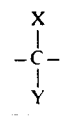

group where X and Y are hydrogen or a hydrocarbon radical.

2. The process of claim 1 where the phosphonate is derived from a compound having the formula

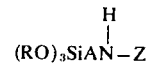

where R is lower alkyl, A is alkylene and Z is hydrogen, a hydrocarbon radical,

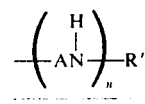

or

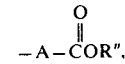

where A is alkylene, n is 1-25, R' is a hydrogen, a hydrocarbon radical or

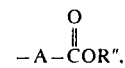

and R'' is hydrogen, alkyl or phenyl.

3. The process of claim 2 where the phosphonate is derived from a compound having the formula

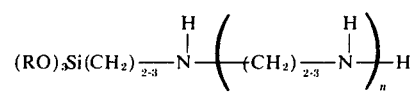

where R is lower alkyl and n is 1-25.

4. The process of claim 2 where the phosphonate is derived from a compound having the formula

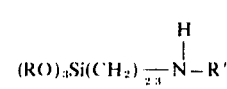

where R is lower alkyl and R' is alkyl.
5. The process of claim 2 where the phosphonate is derived from a compound having the formula
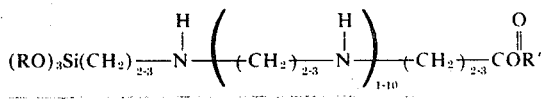
where R is lower alkyl and R' is alkyl.